E. E. OVERHOLT.
RENOVATING AND DISINFECTING DEVICE.
APPLICATION FILED MAY 24, 1902.
1,016,435.
Patented Feb. 6, 1912.
3 SHEETS—SHEET 1.
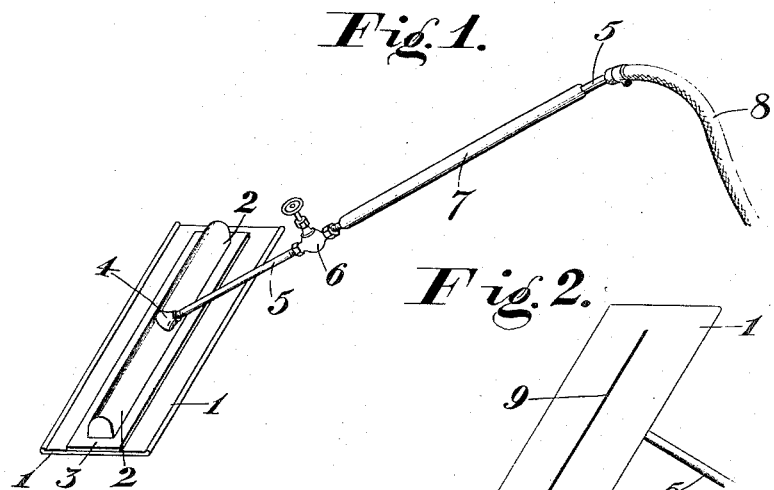
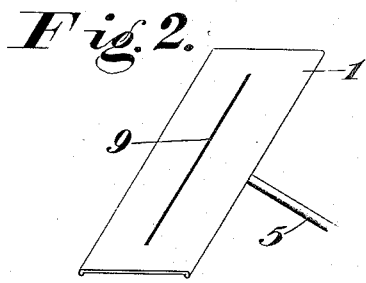
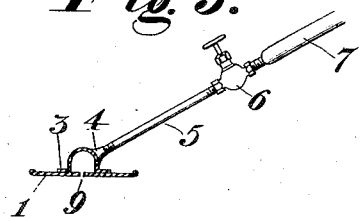
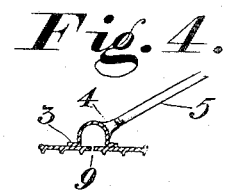
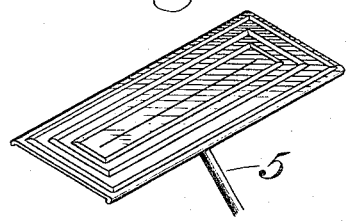
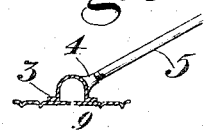
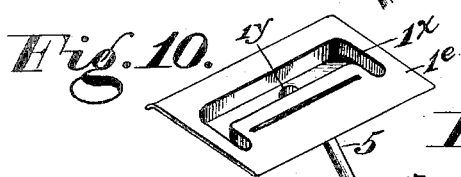
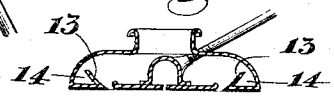
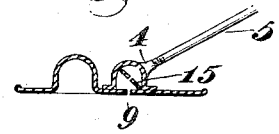
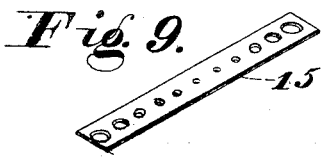

E. E. OVERHOLT.
RENOVATING AND DISINFECTING DEVICE.
APPLICATION FILED MAY 24, 1902.
1,016,435.
Patented Feb. 6, 1912.
3 SHEETS—SHEET 2.
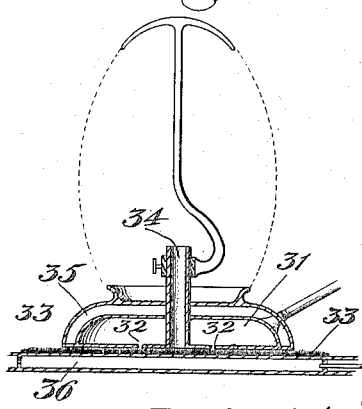
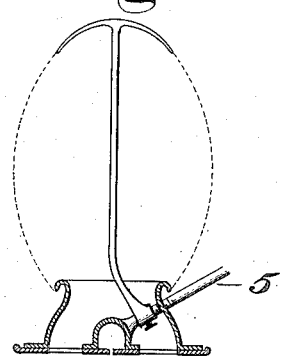
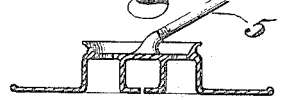
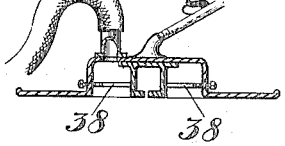
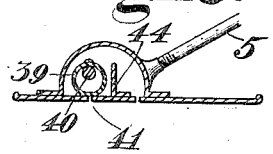
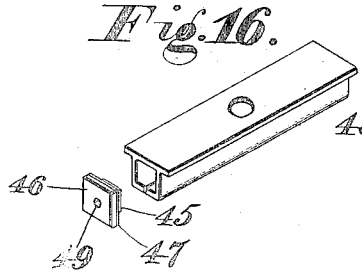
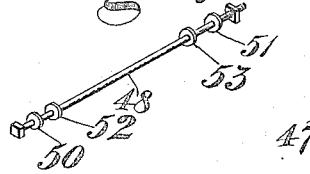
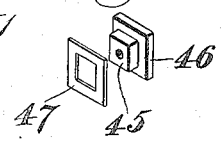
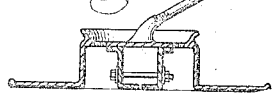
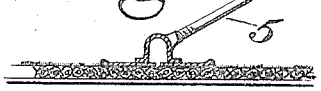
Witnesses
Julius C. Smith
Laura E. Burke
Inventor
E. E. Overholt E. E. OVERHOLT.
RENOVATING AND DISINFECTING DEVICE.
APPLICATION FILED MAY 24, 1902.
1,016,435.
Patented Feb. 6, 1912.
3 SHEETS—SHEET 3.
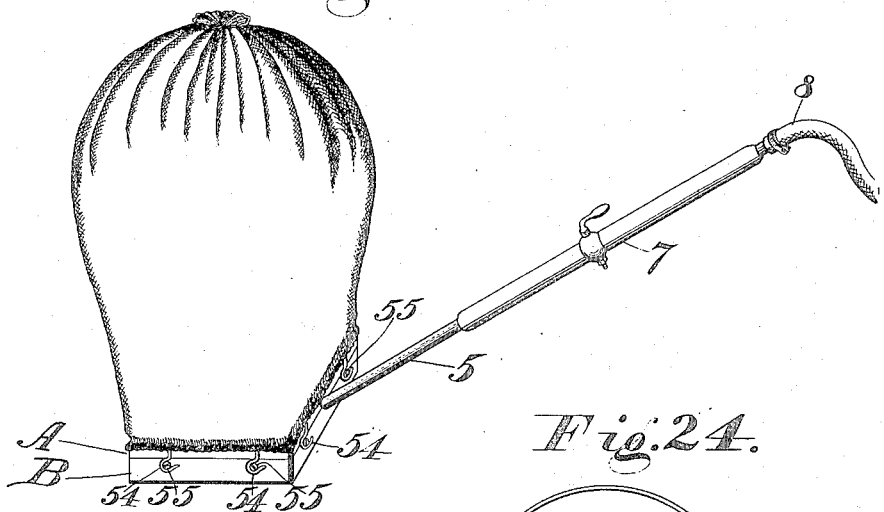
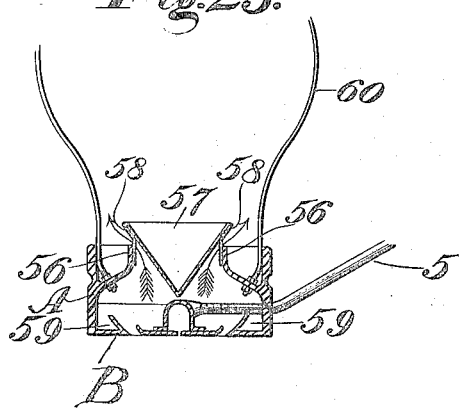
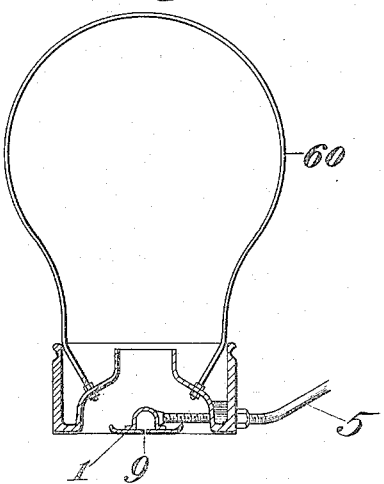
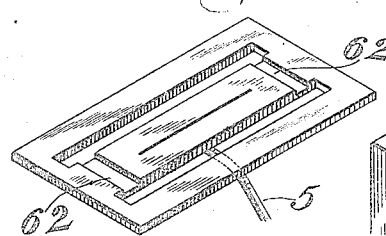
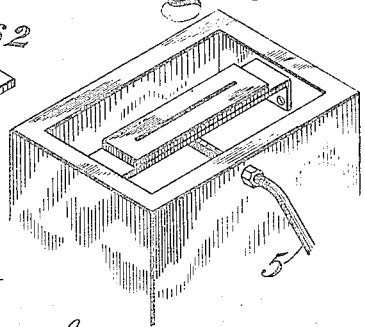
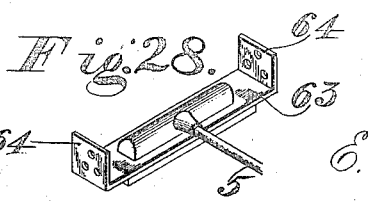
Witnesses
Julia C. Smith
Laura E. Burke
Inventor
E. E. Overholt

UNITED STATES PATENT OFFICE.

EDWIN E. OVERHOLT, OF WASHINGTON, DISTRICT OF COLUMBIA, ASSIGNOR TO MODERN COMPRESSED AIR CLEANING COMPANY, OF WASHINGTON, DISTRICT OF COLUMBIA, A CORPORATION OF THE DISTRICT OF COLUMBIA.

RENOVATING AND DISINFECTING DEVICE.

1,016,435.     Specification of Letters Patent.     Patented Feb. 6, 1912.

Application filed May 24, 1902. Serial No. 108,815.

*To all whom it may concern:*

Be it known that I, EDWIN E. OVERHOLT, a citizen of the United States, residing at Washington, in the District of Columbia, have invented certain new and useful Improvements in Renovating and Disinfecting Devices; and I do hereby declare the following to be a full, clear, and exact description of the invention, such as will enable others skilled in the art to which it appertains to make and use the same.

My invention relates to devices for cleaning and disinfecting fabrics, etc., of all kinds; and more especially to that class of inventions in which compressed air, steam, or other fluid under pressure is used as the active cleaning or purifying agent.

It is especially adapted to the cleaning and disinfecting of all kinds of fabrics or bodies composed of fibrous material such as carpets, curtains, mats, rugs, batting, felt goods, bedding, mattresses, feather beds, furs, wearing apparel, etc.

My object is to provide means by which the active cleaning or disinfecting agent may be effectively and economically applied to the material to be treated, so that its entire force and heat and bulk shall be utilized in the cleaning and disinfecting process.

Fluids under pressure, being highly elastic, are very liable, when applied to work, to escape—in large part—into the open air, without doing any effective service.

My invention provides means which prevents any part of the active agent from escaping into the open air, till it has passed into and through as much of the body of the fabric, as the operator shall predetermine. He is able to direct the course the entire escaping current shall take, causing it to pass horizontally through the body of the material treated, or directly through it in the usual vertical direction.

Another object is to provide means which will deliver the active agent unexpanded into the body of the material being treated, and will hold it in active contact therewith and therein during the period of expansion of said agent; so that the material being operated upon will not only be affected by the impact of the compressed fluid thereupon, but will also, in addition to the results of impact, have all its particles agitated by the expansion of the fluid which takes place therein, and in case steam is used, the material will also be greatly heated during the period of expansion.

A further object is to provide a device having a body adapted to move over a carpet on the floor, with means for confining a material area of the carpet between said body and the floor, and for progressively applying a continuous sheet of steam to said entire confined area.

Still another object is to provide means for raising the temperature of the work being operated upon, to the highest possible pitch, during the steaming process, and also for holding it at that temperature for a material length of time while the machine is in motion, and without stopping the machine or reversing its direction of travel.

A still further object is to provide a device for safely treating fine rugs which have become tender through age.

Other objects will appear in the subjoined description.

The invention consists in certain novel constructions and combinations of parts, as will be hereinafter described and claimed.

An important feature of my invention is a plate adapted to fit in broadside engagement with the material to be operated upon, and provided with a fluid outlet in its working face.

Figure 1 is a perspective view of my invention in its simplest form. Fig. 2 is a perspective of a portion of Fig. 1 inverted. Fig. 3 is a transverse section of Fig. 1, the section being taken to the left of the center. Fig. 4 is a view of a modification similar to Fig. 3, but showing the under side of the surface plate provided with a series of ribs. Fig. 5 is a perspective view of the under side of a modified form of obstructing or surface plate, in which the central slit of said plate, is surrounded by a series of ribs in rectangular form. Fig. 6 is another modification and shows the obstructing plate provided with downwardly extending corrugations instead of ribs. Fig. 7 shows my device provided with a dust collector, the top of which is designed to receive a pipe or strainer. Fig. 8 is a further modification and shows a form of my invention provided with a dust chamber as an integral part thereof: the compressed-vapor chamber having a pressure equalizer located therein. Fig. 9 is a perspective view of the pressure equalizer. Fig. 10 is an inverted perspective showing a modified form of my device very similar to that illustrated in Fig. 8. Fig. 11 illustrates a modified form of my device specially designed for the use of superheated steam etc. Fig. 12 shows a modification very similar in principle to the form shown in Fig. 7; but of more economical construction. Fig. 13 illustrates a modification, identical in principle with that shown in Fig. 12, and simply presents a varied form of cheap construction. Fig. 14 is a modification which shows means of adjusting the width of the air slit; and has a dust chamber opening into a pipe, through which the collected dust is conveyed away. Fig. 15 illustrates a modified form of my device provided with two air slits, and means for closing one of said slits at will. Figs. 16, 17 and 18 illustrate in perspective, certain parts of the adjusting mechanism for the air chamber used with the form of device shown in Fig. 14. Fig. 19 is a modification which shows means for adjusting the air slit slightly different from that illustrated in Fig. 14. Fig. 20 is a longitudinal vertical section through Fig. 15 showing in side elevation the means used for closing the front air slit. Fig. 21 illustrates my invention in coöperative relation to a piece of open net work or matting, upon which is supported the fabric to be treated. Fig. 22 is a perspective view of a modified form of my device, designed for cleaning carpets on the floor. Fig. 23 is a vertical transverse section showing the internal construction of the same. Fig. 24 is a similar view showing a slightly modified form of dust collector. Fig. 25 illustrates still another slightly modified form of dust collector. Fig. 26 is an inverted perspective of the bottom plate of the form of dust collector illustrated in Fig. 25. Fig. 27 is a bottom perspective of a modified form of cleaner differing from that illustrated in Fig. 24, only in the form of surface plate used. Fig. 28 is a perspective view of the surface plate, shown, in inverted position, in Fig. 27.

For convenience of reference, the different parts of my invention are indicated by numerals, the same numerals referring to the same parts throughout the various figures of the drawings.

Referring to the drawings, the numeral 1 indicates the surface plate, which, in addition to other functions, also forms a bottom for the air or vapor chamber 2. This chamber is preferably, semicylindrical in form, and has, as an integral part thereof, the horizontally disposed flange 3. Centrally located on the air chamber 2 is the integral boss 4, designed to receive the inlet pipe 5. At a suitable point within the pipe 5 is the valve 6. The upper portion of this pipe is surrounded by the handle 7. At its extreme upper end this pipe is attached to the hose 8, which communicates with the source or sources from which is supplied the active agent, or agents, employed in the cleaning or disinfecting processes. The obstructing plate 1 has a central longitudinal slit 9, through which the compressed fluid is delivered into the material being operated upon. It also has its front and rear edges slightly upturned and rounded, which causes it to glide more smoothly over the work. In the operation of this form of the device, the plate 1 is caused to rest evenly upon the surface of the carpet in parallel engagement therewith; steam is admitted through the valve 6 into the chamber 2, and thence through the slit 9 into the carpet. The machine is then gently moved over the surface of the carpet, with the result that the entire volume of fluid escaping through the slit 9, passes directly into the body of the carpet, no part thereof being permitted to escape into the open air till it has acted upon the carpet, and (if a heated fluid be used) given up the major portion of its heat to the carpet.

The plate 1 always conforms to the surface of the material being treated, and fits in broadside engagement therewith, and thereby obstructs or retards the steam or other fluid in its passage from the slit 9 to the outer air, and holds it unmixed with the air, in prolonged contact with the carpet, and does not permit it to suddenly rebound from the carpet in an upward-outward direction when it first strikes it; so that the steam in its effort to escape is compelled to travel edgewise through the carpet the entire distance to the margin of the plate. Wherefore for a given amount of steam used, a great amount of work is done, and therefore great economy is effected.

A further advantageous feature arising from the use of the surface-plate 1, is, that since the active agents employed with my machine are of a highly elastic nature, so that tremendous expansion of their bulk takes place when they are released from the machine through the slit 9, the aforesaid plate compels that expansion to take place within the body of the material being acted upon. It confines the active agent temporarily within the fabric while this operation is taking place and therefore utilizes the expansion of the active agent for furthering the ends sought.

With my invention, the particles of any material treated are greatly agitated by the expansion of the active agent employed, (and if steam be use, heated too) and that, both before and after the impact of the blast is delivered upon the said material. In other words, all that portion of the material which is covered by the surface plate is in a state of constant agitation.

When it is desired to pass a current of air directly through a fabric, our obstructing plate still stands us as well in hand as ever; for in that case we only have to support the carpet, or other fabric to be treated, upon wire matting or other open support. The surface plate makes it difficult for the air to escape horizontally, and in that way coöperates with the slit in causing the bulk of the blast to pass directly downward through the fabric, under full pressure, for in this case the line of least resistance is directly through that portion of the fabric immediately underneath the slit. But when the machine is acting upon a carpet which rests upon a solid floor, the line of escape is first directly downward till the floor is reached, and then edgewise through the carpet, and along the under side thereof, between the carpet and the floor, and along the top side thereof, between the carpet and the surface-plate, till the open air is reached.

So thoroughly does the device operate in directing the bulk of the active agent downwardly, that it is found, in actual use, that the machine illustrated in Fig. 1 is an admirable device for steaming feather beds, pillows and the like. The bulk of the steam is driven downwardly into the feathers so effectually that a bed may be thoroughly steamed in a few minutes, without removing any of the feathers from the tick.

If water under pressure, or steam laden with water, be employed, the machine may be used for washing heavy bed clothes etc., especially such articles as comforts or wadded quilts, which are greatly damaged by being washed in the ordinary way, by reason of the fact that the wadding gets pulled apart and bunched, and ever thereafter remains unequally distributed. With my machine the current of water and steam is driven downwardly into the material with such force that it dislodges the dirt and carries it with it, without pulling apart, bunching, or otherwise damaging or disarranging the wadding.

After feather beds, comforts, etc., have been washed, the drying process may be greatly facilitated by using the machine upon them with superheated steam or compressed air taken directly from the compressor in its heated condition.

My device is also very satisfactory for removing dust etc. from heavy clothing, such as overcoats and other wearing apparel, having certain parts padded, which cannot be thoroughly dusted with a brush.

For cleaning fine lace curtains and fabrics of the most delicate texture, which would not stand brushing or washing, a smooth surface should be provided, upon which a number of pieces should be spread, one upon the other: over the top of all should be spread a piece of cheese cloth or other open material, to prevent the material being treated from coming in contact with the surface plate and possibly getting soiled thereby. Then the whole pile can be cleaned at one operation.

If a nozzle is normally held spaced from the work, so that the blast of compressed fluid delivered therefrom upon a fabric has to pass through an intervening space before it strikes the fabric, such rapid expansion of its bulk will take place within that space that the force of its impact when delivered upon the fabric will be distributed over a greatly enlarged area, and the effect produced will be proportionately diminished. But when my machine is at work, the slit in the surface plate 1, is always in contact, on all sides, with the material being treated, so that there is no intervening space between the slit and the work in which expansion of the active agent can take place, before the material is attacked thereby.

A valuable function of the surface plate resides in the fact that it directs a continuous current of steam, unmixed with air, both forwardly and rearwardly of the slit, so that any given part of a fabric to be operated upon, is given a preliminary heating as it is approached by the slit, and is still acted upon by the steam after the slit has passed. The part is attacked by a continuous current of steam and is made hotter and hotter till the slit reaches it with the direct blast, which, owing to the preliminary heating, easily brings the temperature of the material being acted upon, up to that of the steam, and the rearward current of steam serves to hold the material at that high temperature till the rear margin of the plate has passed.

The steam chamber 2, surrounding the slit 9, covers and incloses a material part of the plate 1, which forms its bottom, so that when any given part of the material operated upon is being directly attacked by the blast of steam from the slit, the portion of the plate resting directly upon that part of the material assists in the heating process, since said portion of the plate is always as hot as the steam in the chamber 2. In the form of the device shown in Fig. 11, the steam chamber approximately covers the surface plate.

Fig. 4 shows a surface plate provided with small longitudinal ribs adapted to sink into the pile of the carpet and offer obstruction to the lateral escape of the air.

These ribs also furnish mechanical means for stirring the pile of the carpet when that is desired.

Fig. 5 shows a surface plate provided with a series of rectangular ribs surrounding the central slit. These ribs sink down into the pile of the carpet and greatly obstruct the lateral passage of the fluid in every direction. Every time it passes a rib it has to dive deeply into the carpet, which causes the dirt to be removed very rapidly therefrom.

Fig. 6 shows a form of my device similar to Figs. 4 and 5, except that the surface plate has corrugations projecting from its under side instead of ribs.

Fig. 7 is a view in outline, of my device surrounded by a dust collector, which is adapted to receive a pipe or dust bag around its opening in the top. The dust escaping forwardly and backwardly from the surface-plate, is deflected upwardly by the inclined faces 13 of the dust chambers 14 into which the coarser particles of dust will fall. The remainder of the dust will escape through the opening in the top of the collector.

Fig. 8 shows the outline of a form of device in which the surface plate is provided with a recess 1$^x$ which forms the dust chamber. This chamber may be provided with an outlet if desired, and the outlet may open into a pipe or strainer, or into the open air, or may be closed, as the nature of the work shall require. Fig. 8 also shows a pressure-equalizing plate 15 within the compressed-air chamber or reservoir. Fig. 9 shows a perspective view of this plate. When at work, the chamber 2, having only one inlet pipe, tends naturally to deliver air under greater pressure to that portion of the slit, just opposite this inlet, than to the remaining portions of the slit toward the ends of the chamber. To prevent this, and to maintain an even pressure throughout the entire length of the chamber, I employ the plate 15, located as it appears in Fig. 8, from which it is seen that it forms a longitudinal partition in the chamber 2, dividing it into two compartments—an upper and a lower. At the central portion of the upper compartment, opposite the inlet pipe, the pressure is greatest, and at this point in the equalizing plate, the holes, through which the active agent passes into the lower chamber, are smallest; but they increase gradually in size as they approach the ends of the chamber, where the pressure is of course less. The result is that an even pressure is maintained in the lower compartment of the chamber.

Fig. 10, shows a bottom perspective of a form of my device similar to Fig. 8, but with the dust chamber 1$^x$ provided with an outlet 1$^y$.

Fig. 11 illustrates a form of my device specially adapted to the use of super-heated steam. The steam passes from the supply pipe into the chamber or reservoir 31, and from there through the openings 32, into the pile of the carpet 33, passing horizontally therethrough, till it reaches the escape pipe 34 which opens into the hood or strainer; or if the machine be not provided with a hood, into the open air. The openings in the bottom of the chamber 31, are preferably equidistant from the escape pipe 34. The closed air-space 35 is designed to prevent the steam within the chamber 32, from becoming cooled before it attacks the fabric 33.

Fig. 12 illustrates an economical form of construction of my device, the whole bottom being formed of one piece, very similar to that illustrated in perspective in Fig. 26. The body of the device in this form consists of only three simple pieces—the bottom, the air chamber, and the dust collector.

Fig. 13 shows a varied form of cheap construction.

Fig. 14 illustrates means of adjusting the slit in the air chamber, and shows the dust chamber which surrounds the air chamber on all sides, provided with a pipe through which the dust is conveyed away. It will be seen that by a proper manipulation of the bolts 38, the slit may be entirely closed if desired.

Fig. 15 shows a form of my device provided with two slits, both of which may be used, for rapid work, when there is an abundance of power; but I have shown means of closing one of these slits 41 when it is desired. This means consists of a hollow cylinder 39 composed of yielding material, and suitably attached to and supported by a rod 40 (see also Fig. 20) extending longitudinally from one end to the other of the air chamber, immediately above the slit with which it coöperates, and parallel thereto. The bolt is supported at either end, by the end walls of the air chamber, which are bored to receive it, at points just sufficiently elevated above the slit, to permit the lower side of the cylinder, when in its lowest position, to rest snugly thereon. The bolt has a head 42 at one end, and a nut 43 at the other. When it is desired to open or close the slit 41, the nut 43 is slightly loosed, which permits the rod 40 to be turned in proper position to effect the result sought. When the bolt is in the desired position, it is secured there by again tightening the nut 43. The head 42 of the bolt forms suitable means for moving the same to adjust the cylinder 39, which constitutes the valve. When this valve is brought into the position illustrated in Fig. 15, the air on the inside of the cylinder (composing the same) will, when the machine is at work, press the lower side thereof close against the slit 41, and entirely close it. Between the head 42 and the nut 43 of the rod 40, and the end walls of the air chambers, rubber gaskets are interposed to prevent the waste of any air. The angle bar 44 (Fig. 15) serves two useful purposes. First, it strengthens and renders rigid, that portion of the surface-plate included between the two slits, which if unsupported, would otherwise tend to bend downwardly when there was great pressure in the air chamber. Secondly, it forms a shield for the cylinder valve 39, and prevents it from being directly struck by the inrushing air current.

In Fig. 14, in order that an even adjustment of the slit in the air chamber may take place, it is necessary that the chamber should first be formed with open ends as illustrated in Fig. 16, as an integral piece of metal at either end would prevent the slit from closing or opening. Hence, in order to close the ends and yet to relieve the pressure upon them, when it is desired to adjust the slit, I provide the means illustrated in Figs. 16 to 18. The end caps or covers shown are both alike, and each consists of the inner portion 45,—adapted to be received loosely into the end of the air chamber—and the outer portion or flange 46, designed to cover the end of said chamber. The inner section 45 of each of these integral caps, carries a gasket 47 of yielding material, which surrounds it, and which, when the caps are in operative position, is interposed between the section 46 of the cap, and the outer end of the air chamber. Each of these caps is further provided at its center, with an aperture 49 designed to receive the rod 48 provided like a bolt with a head and a nut. This rod serves as a means of firmly securing the caps in their operative positions. The underside of each cap and its gasket is flush with the underside of the air chamber, so that no air can escape endwise. To prevent the escape of any air through the holes 49 of the caps, I provide the rod 48, with two washers 50 and 51, and with the gaskets 52 and 53— one of each for each end of the rod. When in operative position the gaskets 52 and 53 are interposed respectively between the washers 50 and 51, and the caps of the air chamber, which forms air-tight joints. The object of the washers 50 and 51 is to prevent abrasion of the gaskets 52 and 53, by the head and nut respectively of the rod.

The form of device illustrated in Fig. 13, as well as the forms illustrated in many other figures of the drawings, may be cast in one piece with a hole at each end of the air chamber, which holes are closed with plugs after the core has been removed. A great advantage of this form of the device is its cheapness.

Fig. 19 illustrates a slight modification in the manner of adjusting the air-slit. Screwing up the nut on the bolt shown closes the air slit.

Fig. 21, illustrates my device operating on a piece of carpet supported on wire matting, or other open or reticulated support, which causes the escaping current of fluid to pass directly through the carpet.

Fig. 22 illustrates a form of my device provided with a hood or strainer. The dust collector is formed of two sections A and B, secured together as shown by means of the hooks 54 carried by the upper section, and the screws 55 carried by the lower. Fig. 23 illustrates in outline, the internal construction of this form of my device, the hooks and screws being omitted. From this it will be seen that the two sections of the device, at their point of meeting, present inclined faces to each other, which when they are united, forbids any horizontal motion of the two parts at their point of union. The preferably integral and inwardly extending section 56, forms a dust pocket while the dust-pan 57, in the form of an inverted roof, is suitably supported on the section 56, by the four supports 58, which are narrow strips of metal, secured to the section 57 at their top ends, and to the section 56 at their lower ends. An abundant air space is left between the inclined sides of the pan 57 and the top of the section 56. When the machine is in operation the dust passes upwardly through these spaces into the hood, which is made of any kind of material whatever, suited to catch and hold the dust while permitting the air to pass through it. The coarser particles of dust are caught in the dust receptacles 59 of the lower section, and also to some extent, on top of the surface-plate. The remainder of the dust is borne up, as indicated by the darts, into the hood and deposited on the walls thereof, as the air escapes. As it is gradually shaken down from the walls of the hood, it falls into the pocket formed by the section 56; and a portion thereof also falls into the pan 57.

The dust collector shown in Fig. 24 is very similar in principle to the one just described, but possesses this advantage, that it is made in one piece.

The form of device shown in Fig. 25 is very similar to that shown in Fig. 23; but as is also the case with the form illustrated in Fig. 24, it has nothing corresponding to the dust pocket 59 of Fig. 23. Its surface-plate however has attached to its top, the light pieces of sheet metal 61, having their outer portions extending upwardly which converts the top of the surface plate into a dust pan. The form of device illustrated in Fig. 25, has this advantage over that illustrated in Fig. 23, namely, that its entire bottom section including obstructing plate and all, can be formed in one piece, so that its bottom would present an appearance substantially like that illustrated in Fig. 26.

In the form of bottom illustrated in Fig. 26, the recesses 62 are provided in order that there may be a free air space entirely surrounding the central slit.

Fig. 27 shows an inverted view of the form of dust collector illustrated in Fig. 24, provided with a varied form of surface plate and air chamber easily attached to this form of dust collector. In order to afford a free air space all around the central slit, the surface-plate is somewhat short, and is made to stand out in relief on the flange section 63 of the air chamber. This flange section 63 has upturned ends 64 which furnish convenient means for attaching the same to the dust collector.

Having thus fully described the principles of my invention, and having shown means for applying the same to use, I yet do not wish to be limited to the exact showing made; but desire protection on all that comes within the spirit and scope of my invention.

This application is related in greater or less degree to the following applications: Serial Nos. 278,010, 298,617, and 440,128.

What I claim as new, and desire to secure by Letters Patent is:

1. In a device of the character described, a body having a broad working face adapted to fit upon the work in broadside engagement therewith, and provided with an outlet at a material distance from all margins of said working face, said face being unperforated between said outlet and its margins.

2. In a device of the character described, a body adapted to rest upon the carpet and provided with a steam outlet opening in direct contact therewith; and means for imparting to any given portion of the fabric a continuous preliminary heating for a material length of time before it is reached by the approaching outlet, and for continuing said heating process for a material length of time after it has been passed by the outlet.

3. In a device of the character described, a body adapted to move over the surface of a carpet and provided with an outlet opening in direct contact therewith; and means directly surrounding said outlet for directing the current of steam forwardly and rearwardly over the surface of the carpet for a material distance from said outlet, said means holding the entire bulk of said escaping current in closest contact with the carpet and unmixed with the surrounding air.

4. A device of the character described, having a plate fitting in broadside engagement with the work and having an outlet opening in direct contact therewith; and a steam chamber on top of said plate, said chamber being in communication with said opening and having an inlet in communication with a supply of steam.

5. A device of the character described, having a plate fitting in broadside engagement with the work and provided with an outlet opening in direct contact therewith; a steam chamber covering the top of said plate, said chamber being in communication with said outlet and having an inlet for live steam; and a hollow wall between said steam chamber and the outer air.

6. In a device of the character described, a plate having a working face adapted to fit in broadside engagement with the work, and having a central pipe leading upwardly from said face; and a steam chamber on top of said plate and provided with an outlet opening through the working face around said central pipe, said outlet being spaced a material distance from said central pipe and from the margins of the plate.

7. In a device of the character described, a plate having a working face adapted to fit in broadside engagement with the work, a central pipe leading upwardly from said face; a steam chamber on top of said plate and provided with an outlet opening through the working face around said central pipe, said outlet being spaced a material distance from said central pipe, and from the margins of the plate; and a hollow wall between said steam chamber and the outer air.

8. In a device of the character described, a chamber having means for communicating with a source of supply of compressed fluid, and having an outlet for said fluid; and means for holding the entire escaping current of the fluid in contact with the surface of the material to be treated during the period of expansion of said fluid.

9. In a device of the character described, a chamber and means for delivering thereto a constant supply of compressed fluid; said chamber having an outlet adapted to be in direct contact with the material to be treated; and means for preventing the entire escaping current from mixing with the surrounding air for a comparatively prolonged period, and for holding said escaping current in close contact with the material being treated during said period, and preventing the escape of any portion thereof taking place only in active contact with said material.

10. In apparatus of the class described, the combination with a body having an inlet leading thereinto and a broad face adapted to fit closely, both longitudinally and transversely, upon the surface of a carpet, and provided with an aperture at a relatively great distance from the margins of the face, said aperture being in communication with said inlet; of means for delivering through said inlet to said aperture a highly compressed fluid, said aperture being in direct contact with the surface of the fabric, the area of the aperture being not greater than the area of the inlet leading thereto; whereby the fluid is compelled to enter the carpet before expansion, to expand in the carpet, and escape only after having entered the fabric, and after having passed edgewise through the same to the margins of said broad face.

In testimony whereof I affix my signature, in presence of two witnesses.

EDWIN E. OVERHOLT.

Witnesses:
JULIA C. SMITH,
LAURA E. BURKE.